July 21, 1964 G. S. STUBBS ETAL 3,141,968

ANALOG COMPUTER

Filed Dec. 18, 1958 3 Sheets-Sheet 1

INVENTORS:
GILBERT S. STUBBS
GEORGE P. WACHTELL

BY Howson & Howson

ATTYS.

ANALOG COMPUTER

Filed Dec. 18, 1958 3 Sheets-Sheet 2

INVENTORS:
GILBERT S. STUBBS
GEORGE P. WACHTELL
BY Howson & Howson
ATTYS.

July 21, 1964 G. S. STUBBS ETAL 3,141,968

ANALOG COMPUTER

Filed Dec. 18, 1958 3 Sheets-Sheet 3

INVENTORS:
GILBERT S. STUBBS
GEORGE P. WACHTELL
BY Howson & Howson
ATTYS:

3,141,968

ANALOG COMPUTER

Gilbert S. Stubbs, Levittown, Pa., and George P. Wachtell, Haddontowne, Haddonfield, N.J., assignors, by mesne assignments, to Atomic Power Development Associates, Inc., Detroit, Mich., a corporation of New York Filed Dec. 18, 1958, Ser. No. 781,259
8 Claims. (Cl. 235—185)

This invention relates to an analog computer and, more specifically, to a component for an analog computer which simplifies the computer equipment necessary to solve certain types of problems involving simulation of relative flow.

Traditionally, analog computers have been of such a nature that after the problem as a whole, using boundary conditions and other known references is set up, the solution is completed in one step by the computer without intermediate computation. Using a digital computer, by contrast, small parts of problems may be solved, combined to make greater parts which, in turn, are combined to make still greater parts. Moreover, solution of many problems using digital computers involves iteration. From one solution a more accurate solution may be predicted and obtained, and by such a process of refinement eventually a highly accurate approximation is obtained. Analog computers, on the other hand, often give directly, without iteration, solutions difficult to obtain with digital systems. Analog computers, of course, are only as accurate as their input information and as the analog representation.

In many applications an analog computer which employs lumped parameter elements can only approximate the characteristics of a distributed parameter system by treating it as a finely divided lumped parameter system. The accuracy of the approximation generally increases with the number of lumped parameter divisions employed. Accurate analog representation of a finely divided lumped parameter system by conventional equipment can be very costly in terms of the large number of operational amplifiers and servo-multipliers required. As a practical matter, then, there are many classes of problems of this type which are too costly to solve with a high degree of accuracy on conventional analog equipment. The cost of solution of such problems on digital equipment is likewise great.

The present invention makes possible, within the bounds of economic reasonableness, analog consideration of a distributed parameter problem on a lumped parameter basis, particularly where elements of a distributed system are moving or changing. More specifically, the computer of the present invention is capable of simulating conditions represented by partial differential equations (i.e., a distributed parameter system). Such systems, for example, are heat transfer systems, electrical distribution systems, and chemical processing systems. These systems have in common parameter elements defined on a per unit length, per unit area, or per unit volume basis.

The computer of the present invention employs a switching component in its analog computations to achieve a variety of novel effects. In order to employ this new component, various arrangements of relatively movable contacts have been employed. Commercially available switches, such as telephone stepping relays, have been adapted for this purpose and in various arrangements can be employed to provide a variety of novel computer switch operations, including read-in and read-out of analog information stored in capacitors, automatic switching of resistors and capacitors and computing networks, automatic adjustment of resistance values, automatic iteration, automatic scanning of computer networks for multi-signal recordings, automatic "null-signal-homing" operations, and continuous switching of computing elements for "time-sharing" computations.

More specifically, the present invention concerns an analog computer in which is employed a component for rendering certain components selectively connectable with a selection of other components. A matrix of first contacts wherein various contacts are connected together to simulate the successive positions assumed by a particular element of a moving stream is subject to a wide variety of arrangements. An array of second contacts is employed to cooperate as a whole with the first contacts in such a way that relative movement between the first and second contacts causes the increment represented by the components connected to the first contacts to appear to move relative to the element represented by the components connected to the second contacts. As a result of this relative movement, each of the second contacts represents some fixed position in a system through which flow is proceeding, and each of the first contacts represents the flowing medium in its changing relationship relative to the fixed contacts. Suitable means is provided for supporting the respective contacts and permitting their relative movement.

For a better understanding of the present invention, reference is made to a thermal system in which coolants are employed. The system illustrated is a counter flow system which serves as a heat exchanger. Flow of one fluid proceeds in one direction while flow of another fluid proceeds generally in the other direction. All flow is relative to parts of the heat exchanger. This embodiment of the invention is shown in the following drawings in which.

Figure 1:
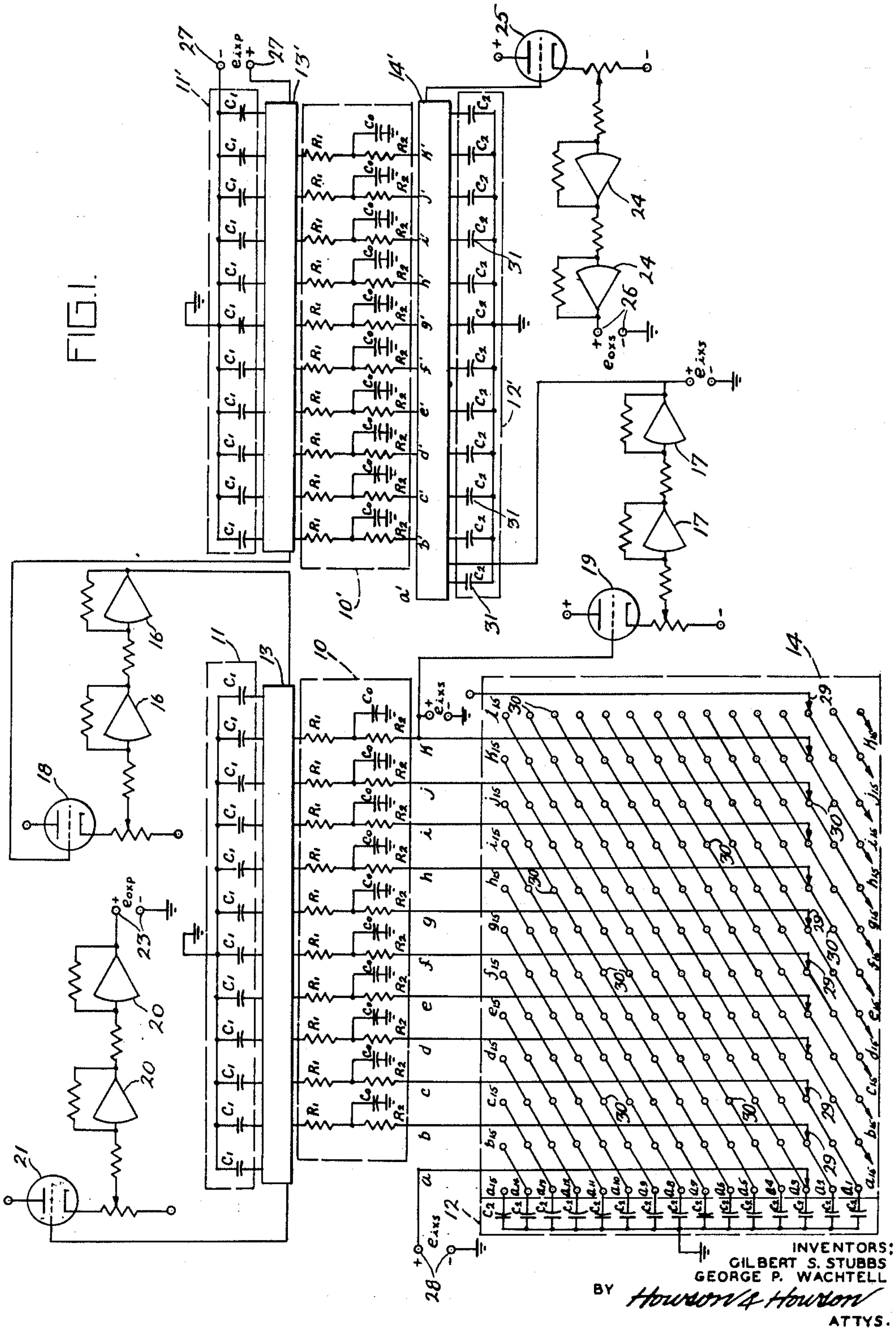
FIG. 1 represents schematically an analog computer simulating a counter-flow heat exchanger.

Referring first to FIG. 1, the arrangement illustrated represents a computer simulating a counter-flow heat exchanger useful, for example, in connection with a nuclear reactor. This arrangement might simulate, for example a situation in which coaxial piping is provided for the coolant within the heat-exchanger. Within the inner pipe sodium might be carried circulating in one direction relative to the heat exchanger. Between the outer wall of that pipe and the inner wall of the outer pipe, sodium or another suitable coolant might be circulated in the opposite direction relative to the flow of the sodium.

In the computer a part of the tube wall is represented by the region within the dashed boxes 10, 10'. The primary coolant is represented by the structure within the dashed boxes 11, 11', and the secondary coolant within the dashed boxes 12, 12'. The flow of the primary coolant is simulated by the relative movement of contacts of the switching components within the boxes 13, 13', and the flow between the secondary coolant and the tube wall is simulated by the relative movement of contacts of the switching component within the boxes 14, 14'. The switching components within the boxes 13, 13', 14, 14' are similar. Use of more than one switching component for a particular coolant as here may be dictated by the number of available contacts in the switching component.

It can be seen that the elements provide a simple resistance-capacitance network. The flow effect progresses by virtue of the switching system 13, 13', 14 and 14'. A certain amount of heat will be conducted through and/or stored in the tube walls whose thermal resistances along with the coolant film resistances represented by resistors $R_1$ and $R_2$. The heat storage capacity of the fluids is represented by capacitor storage elements $C_1$ (within boxes 11 and 11') and $C_2$ (within boxes 12 and 12'), and the heat storage capacity of the wall is represented by capacitor $C_0$. Currents represent the flow of heat and may be either into or out of the coolant (usually out of the primary and into the secondary coolant). Accumulating charges on the capacitors represent heat storage and diminishing charges represent heat extraction. The voltage at any point is proportional to the temperature in the analogous location in the heat exchanger.

If the number of subdivisions in the analog representation is greater than can be accommodated by one switching component, more than one component can be employed if suitably connected. Thus, as shown in FIG. 1, there may be intermediate operational amplifiers 16 in the chain of capacitors $C_1$ representing the primary coolant and intermediate operational amplifiers 17 in the chain of capacitors $C_2$ representing secondary coolant system. To effect impedance decoupling, cathode followers 18 and 19 are employed between the output of one stage of capacitors and the amplifiers 16 and 17. Intermediate operational amplifiers 20, together with cathode follower 21, may also be employed at the output end of the capacitor chain 11 before the output terminals 23. Similarly, intermediate amplifiers 24, together with cathode follower 25, may be employed at the output end of the capacitor chain 12' before the output terminals 26. The input terminals 27 for the primary coolant system 11, 11' and the input terminals 28 for the secondary coolant 12, 12' are quite similar to one another. There are impressed on the input terminals 27 and 28 voltages proportional to the temperature of the coolant introduced at their analogous points. At the output terminals 23 and 26 the voltages obtained are proportional to the output temperatures of the respective coolants.

In the system the tube wall is simulated by resistors $R_1$ and $R_2$. $R_1$ is proportional to half of the tube wall resistance plus the primary film resistance to heat flow. $R_2$ is proportional to half the tube wall resistance plus half the secondary film resistance to heat flow. As previously indicated, capacitors $C_1$ are proportional to the heat capacity of the primary coolant element, capacitors $C_2$ are proportional to the heat capacity of the secondary heat coolant elements, and capacitors $C_0$ are proportional to the heat capacity of the tube wall element. In a uniform system, resistors and capacitors of the same designation would be equal at all points. In the simple system illustrated, the capacitors all have one side connected in common to ground.

The switching components within the boxes 13, 13', 14 and 14' are similar so that it is necessary to illustrate only one for all to be understood. As illustrated, box 14 is taken as an example. Within this box is a switching component having 12 movable contacts or brushes, each generally designated 29 and sometimes referred to as the second or secondary contacts. Except for the extreme right and extreme left hand brushes each brush is connected to one of the resistances $R_2$ simulating the wall and film heat flow impedance. In the boxes 13, 13' the movable contacts similar to 29 are connected to resistor $R_1$. For convenience the total is simulated by resistors $R_1$ and $R_2$ connected together at a junction point with one plate of capacitance $C_0$. The movable contacts 29 and their associated connections to the wall simulating resistors are designated by letters *a, b, c, d, e, f, g, h, i, j,* and *k*, and *a', b', c', d', e', f', g', h', i', j'*, and *k'*. In the arrangement shown, there is a matrix of 180 fixed contacts, which contacts are generally designated 30. These contacts are preferably arranged in the form of a rectangular matrix with one dimension, the number of columns of the matrix, corresponding to the number of movable contacts or brushes 29, in this case 12. In the instance shown, the matrix is a 12 x 15 matrix and the arrangement is such that each of the terminals 30 in each column is connected to one terminal of every other column and to one of the capacitors $C_2$, such that each terminal is connected to one and only one capacitor. As in the arrangement illustrated, it is often most convenient to make the second contacts 29 or brushes movable and to place them in such a way that they contact first contacts in the same row and move from row to row as they move along their respective columns. With this arrangement, the simplest wiring scheme for achieving the desired end is to arrange for adjacent contacts, both first and second, to be connected to components simulating adjacent elements. When this is so it is possible to connect the contacts diagonally along generally parallel paths so that contact in one row is connected to the contact in the next row which lies in the next column. It will be obvious that other arrangements may be convenient. For example, all contacts in each row may be connected together and each brush 29 offset one row from its adjacent brush along a diagonal. Most conveniently, the matrix is made cylindrical with the columns around the matrix so that as the brushes pass from the fifteenth to the first row, the spacing between those rows will be the same as between any other. Such a contact arrangement with different connections for a different purpose is commonly found in the telephone stepping switch, and the telephone stepping switch may be used in the practice of the present invention. It will be observed that if the columns are numbered by letters corresponding to brush designations and the rows are numbered by numbers, each first contact 30 may be represented by a letter indicating its column and a subscript number representing its row. As the brushes 29 move over the fixed contacts the diagonal coupling makes it appear that the fixed wall of the heat exchanger, for example, is exposed successively to different elements of coolant whose heat capacity is represented by the successive capacitors. It will be obvious that the matrix of first contacts 30 may be moved relative to the second contacts 29 with identical effect and in some cases this might be desirable.

In operation, the stepping switch is rotated at a speed proportional to the rate of flow. The voltages impressed at input terminals 27 and 28 simulating input temperatures are transferred to one capacitor $C_1$ or $C_2$, respectively, and then to the next as brush "*a*" moves through contacts $a_1$, $a_2$, $a_3$ . . . $a_{14}$, $a_{15}$, $a_1$, $a_2$ . . ., and on through additional cycles. If the input temperatures change, the input voltages must be changed. The voltage which is stored on a particular $C_1$ or $C_2$ capacitor, representing the temperature of a particular increment of coolant, is then successively modified by current flowing into or out of the capacitor as sequential connection is made to various resistors, $R_1$ or $R_2$, representing different parts of the heat exchanger wall. The action is such that a particular capacitor, one of those designated $C_2$, for example, after being charged by the input terminals by brush *a* is then connected to the resistor $R_2$ at the *b* brush, next connected to the resistor $R_2$ at the *c* brush, etc., through the system. For example, the voltage stored on the capacitor $C_2$ connected to terminal $a_3$ in the position shown in the drawing, is successively moved as the brushes move upward until the *k* brush contacts terminal $k_{13}$ and the voltage is transferred at this point through the intermediate operational amplifier 17 to a capacitor 31 which simulates the input to the second half of the secondary system and is connected to brush *a'* which corresponds to the *a* position brush in the first section. The same type of contact arrangement permits an operation similar to that in the first section of the heat exchanger to take place in the second section of the heat exchanger as the first and second contacts in switching component 14' are subjected to relative movement. The same type of action, but adapted to simulate flow in the opposite direction, takes place in the switching components 13' and 13.

It will be appreciated that any arrangement of contacts which permits the desired ends is acceptable in accordance with the present invention. In addition to rearrangement of the elements of the switching components, it is possible to rearrange other components to simulate the same effects in other ways or to simulate many other different effects.

Figure 2:
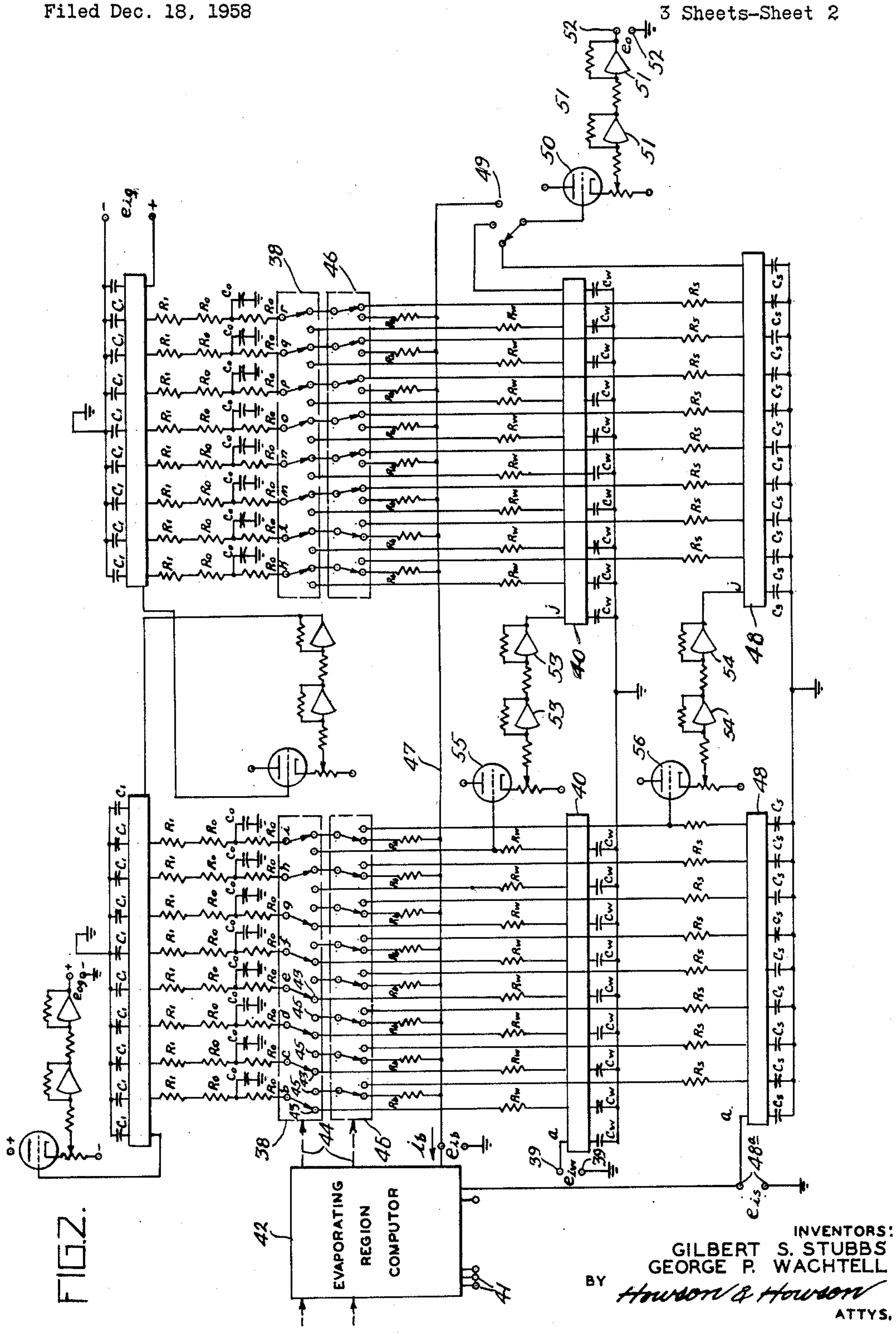
FIG. 2 shows a modified form of the heat exchanger wherein one of the counter flowing fluid coolants is evaporated.

Referring now to FIG. 2, a modified system somewhat similar to that of FIG. 1, but one wherein water or some other vaporizable coolant is simulated as one of the counter flowing coolants. In FIG. 2 provision is made for vaporization of the coolant, such as the conversion of water to steam. In this system the thermal resistances of the wall and films are respectively represented separately as $R_0$ and $R_1$ on one side and $R_0$ and $R_w$, $R_b$ or $R_s$ on the other side. In the arrangement shown, a plurality of switches 38 are interposed between resistors $R_0$ and the circuits simulating the vaporizable coolant. In this case, each of the switches 38 is a two-position switch whereby either of two circuits may be selectively connected to the wall simulating part of the computer. In one switch position of each switch a group of capacitors $C_w$ simulating the heat capacity of successive increments of water are arranged to be sequentially connected through resistors $R_w$ representing the film resistance of the water to resistors $R_0$ simulating the heat flow impedance of the heat exchanger. Since it is assumed that the coolant at input will be unvaporized, the input terminals 39 are connected to the first or a capacitor $C_w$, as shown. It will be seen that switches 38 in positions *b, c, d, e, f,* and *g* are all closed to the water terminals 43, and this connection makes the first portion of the water simulating side of the computer operate exactly as in the case of the computer of FIG. 1, as the switching component 40 causes the capacitors $C_w$ to be sequentially connected to the resistors $R_0$.

The potential at each of the terminals *b* through *r* of switching components 40 is brought back by means of leads 41 to a special evaporation region computer 42 for determining the beginning of the region of evaporation. When the voltage level representing water temperature reaches the evaporation point at a particular water terminal of switching component 40 in this case the water terminal at position *g*, the next relay, at *h*, will be shifted through its separate set of leads 44 to the intermediate contact 45 of switch 38. The intermediate contacts 45 are connected to a second switch 46, similar to switch 38. In one position this switch connects the wall simulating resistor $R_0$ to a common bus 47 through film simulating resistors $R_b$. Bus 47 has applied to it a voltage $e_{ib}$ proportional to the evaporating temperature of the water. In the other position of switch 46 the wall simulating resistors $R_0$ are connected to the capacitors $C_s$ through the film simulating resistors $R_s$ and through the movable contacts of a switching component.

In the evaporating region represented by the above described system portion the heat flow into the coolant is transforming water into steam and no change in temperature occurs. Since there is no temperature change there is no need to store or dissipate the temperature simulating voltage. All heat flowing into this region goes directly into transforming water into steam. The latent heat of evaporation is a known quantity for a given coolant substance and a given pressure and the evaporation region computer adjusts the second group of switches 46 through leads 44 so as to terminate the evaporating region at a point where the total heat added per unit weight of water is sufficient to completely vaporize the water. The current $i_b$ which represents the heat flow in the evaporation region is measured and adjusted through the action of switches 46 so that simultaed heat flow is approximately equal to the latent heat of vaporization times the mass flow rate of the fluid.

Beyond the region of evaporation as determined by computer 42 is the super-heated steam region which is simulated in the manner described above. The capacitors $C_s$, like capacitors $C_w$, are arranged to be sequentially connected by a switch component 48, similar to 40, to the various resistors $R_s$ to simulate the flow of steam past various exchanger walls. A voltage representing the initial temperature of the super-heated steam, the temperature of evaporation, is inserted at terminals **48*a* which are connected both to the computer 42** and the capacitor $C_s$ in "*a*" position.

A selection switch 49 at the output connects a cathode follower 50 and intermediate operational amplifiers 51 into the particular circuit selected before the output terminals 52, in the example shown the steam phase. Switch 49, schematically represented, is also operated, by the evaporating region computer 42 so that it will agree with the proper phase of the water at the output.

The water and steam phases each have their own intermediate amplifier stages 53 and 54 which are introduced by a cathode follower 55 and 56, respectively, as shown. The purpose of these elements is exactly the same as the purpose of FIG. 1.

The evaporating region computer 42 has been shown as a box. Actually, it may advantageously employ switching components quite similar to those used to simulate movement of coolant through the computer. There are preferably two such switching components, one having to do with the point at which water is first converted to steam by evaporation and one to determine the point at which all water has been converted to steam. Each of these components is much like the switching component for simulating movement of fluid increments through the heat exchanger except that they do not continuously move because they are not intended to simulate a rate of flow. An understanding of the principle on which they work may be had by consideration of the switching component used to adjust the switches 38 from contacts 43 to 45. Switches 38 may be actually part of the switching component. Voltage signals simulating temperature are received from the moving contact side of each of the resistors $R_0$, for example. When the temperature represented by the voltages at these points reaches the evaporation point at a particular location, say at point *g*, if the position-determining brush of the switching component is not at that point, it will be moved to that point by a servo operation of a drive element. This process, for example, may be carried out by the use of an operational amplifier in which a comparison is made between the various voltages at the various points and a reference voltage which represent the temperature at which evaporation begins. If the voltages at any one point contacted by the position-determining brush are equal to the reference voltage, a balance is struck, but if the voltage is greater or smaller, a negative or a positive signal may be generated. If the position-determining brush of the switching component is not in proper position, positive error signals may be used to drive the switching component in one direction and negative error signals may be used to drive the switching component in the other direction. The most satisfactory arrangement then is for various contacts in the various rows to be connected together into two groups. One group will energize the relays 38 to move against their contacts 43 and the other group will urge the relays against their contacts 45. This may be done on a step-wise basis so that, for example, in the first row all contacts are connected together and to the relay actuation means calling for closing of contact 42. The next row will then have its remote contact, corresponding to the most remote element (the first subjected to evaporating temperature) connected to the relay element actuating the switch 38 into contact position 45, while the others will be adapted to cause closing to contact 43. The following rows will reduce the number of positions in which contact 43 will be closed and increase the number of positions that contact 45 will be closed. The brushes are arranged so that they contact all of the contacts in a given row at one time. When an unbalanced condition results, their position will continuously change until a balanced condition is reestablished.

In tandem with the fixed contacts of the matrix representing the position switch 38 closed to contact 45 is the second switching component which has a similar arrangement whereby selection is made of the contacts of switches 46 between the evaporating and saturated steam regions. Signals to this switching component are represented schematically as being sent out to the switches 38 and 46 through individual leads 44.

Figure 3:
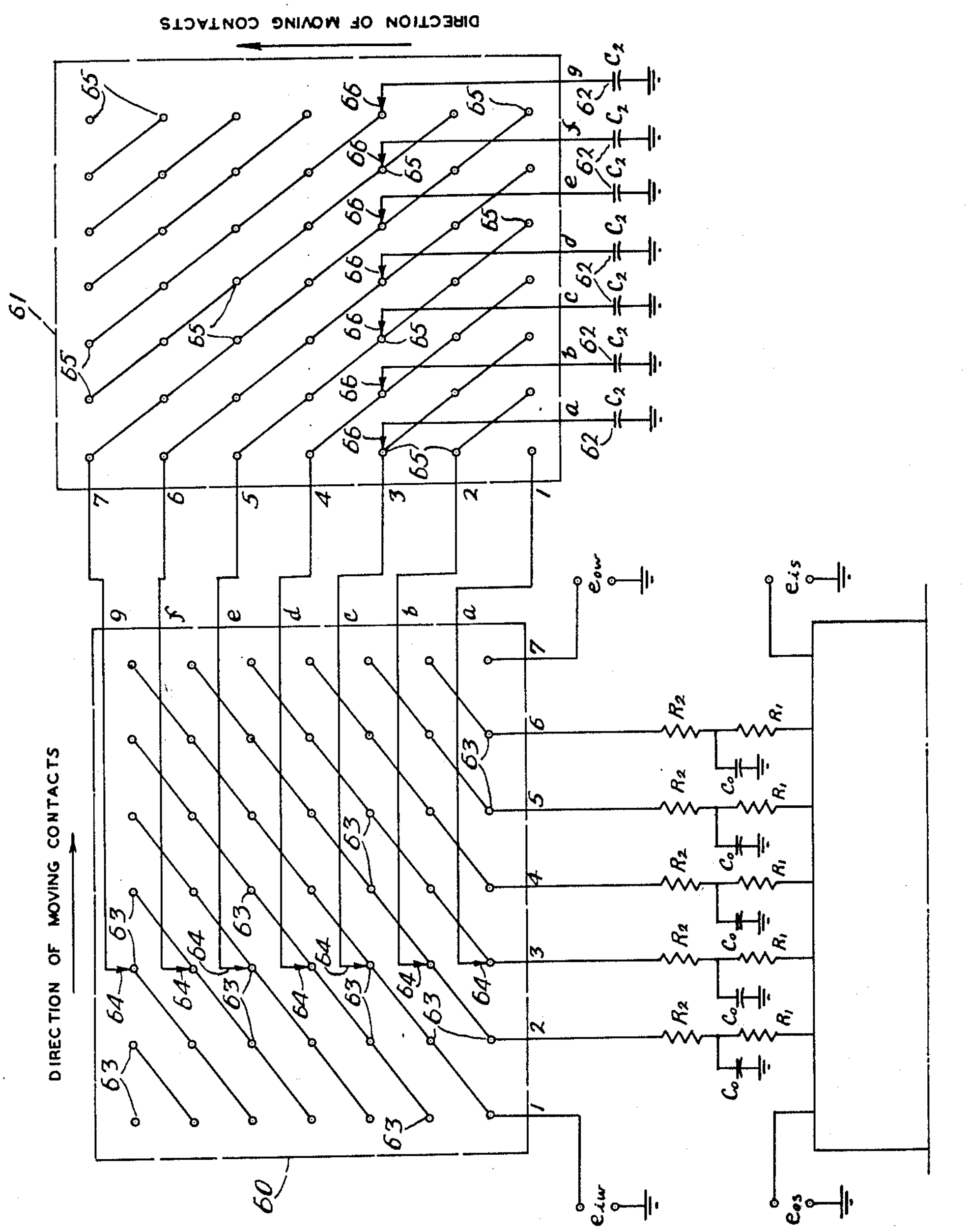
FIG. 3 shows a modified arrangement wherein the switching components employed are not reversible but the effect of reversibility is obtained.

FIG. 3 illustrates an arrangement for use in a computer wherein flow may reverse under circumstances where a reversible stepping relay or other suitable reversible switching means is not available. The arrangement of the switching components 60, 61 shown, except for a smaller matrix indicating fewer increments, is similar to that shown in FIG. 1. However, the input to the first or matrix contacts of one switching component 60 is not from ungrounded plates of capacitors 62 but from another or second switching component 61 and, in the case illustrated, from the fixed or first contacts thereof. In other words, considering the first switching relay 60 as that, having its fixed contacts 63 connected at the ends of the numbered rows in the "*a*" column to the resistors $R_2$ and the contacts 63 are diagonally connected to each other, as in the switching component shown in FIG. 1. Each of the rows of the fixed contacts *a, b, c, d, e, f* and *g* has a movable contact 64 associated with it so that in movement they will sequentially cover all of the fixed contacts 63. The movable contacts are, in turn, connected to the fixed contacts 65 of second switching relay 61. Its movable contacts 66 are, in turn, connected to the capacitors 62, which correspond to the capacitors in FIG. 1 designated $C_2$. If the directions of movement of the movable contacts of the relays are as shown, and the direction is not reversible, movement of the contacts of relay 60 will make flow appear to be in one direction while movement of the movable contacts of relay 61 will make flow appear to proceed in the other direction.

The present invention has been described in terms of preferred embodiments. Many alternative arrangements are possible and will occur to those skilled in the art. Moreover, the same computer, or modified computer, may be used for other problems such as electrical distribution and chemical processing, either by itself or as a part of a larger computer.

We claim:

1. An analog computer component for simulating relative motion, such as flow conditions and the effects thereof upon a variable comprising
   - a potential input for introducing a voltage which represents a measured variable at a point where its magnitude is known,
   - a first array of elements including capacitive elements simulating successive parts of the structure relative to which motion takes place,
   - a second array of elements including capacitive elements simulating adjacent volume elements within a moving medium,
   - a component for rendering the elements of one array selectively connectable with elements of the other array and for simulating the effect of the variable upon the successive elements of moving medium and successive structural parts, including
   - a group of first contacts comprised of a matrix of columns and rows of contacts, the contacts in any given row being connected to different elements of one array and to other contacts in other rows,
   - a group of second contacts fixed relative to one another and connected to elements of the other array from the one to which the first contacts are fixed, and also having one of its contacts connected to the potential input,
   - and means for driving one set of contacts relative to the other at a rate to simulate a desired motion.

2. The computer component of claim 1 in which the first contacts are so connected to one another that one contact to each column is connected to one contact in every other column, each in a different row such that contacts connected together are in adjacent columns and rows, and the second contacts are arranged for contact with successive rows of the first contacts.

3. The computer component of claim 2 in which the first contacts are in a rectangular matrix and the second contacts are movable over them.

4. The computer component of claim 3 in which the second contacts are movable over the first in a direction transverse to the rows.

5. The computer component of claim 4 in which the first contacts are in a cylindrical array and the second contacts are movable over them.

6. The computer component of claim 5 in which associated with each first contact is a third contact so positioned that the first and the third contacts form a pair to be shorted together by the second contacts.

7. The computer of claim 1 including also a second component having first and second contacts as in the first component, one set of contacts of the first component being connected to one set of contacts of the second component whereby relative movement limited to only one direction in each component simulates flow in both directions.

8. The computer of claim 7 in which the second contacts of one component are connected to the first contacts of the other component.

References Cited in the file of this patent

UNITED STATES PATENTS

| | | |
|---|---|---|
| Re. 22,947 | Clary et al. | Dec. 9, 1947 |
| 2,186,949 | Allison et al. | Jan. 16, 1940 |
| 2,318,591 | Couffignal | May 11, 1943 |
| 2,470,434 | Eckman et al. | May 17, 1949 |
| 2,684,201 | Starreveld et al. | July 20, 1954 |
| 2,802,624 | Kayan | Aug. 13, 1957 |
| 2,829,822 | Reynolds | Apr. 8, 1958 |
| 2,900,462 | Thomas et al. | Aug. 18, 1959 |
| 2,914,250 | Honore et al. | Nov. 24, 1959 |
| 2,958,466 | Alway | Nov. 1, 1960 |

OTHER REFERENCES

An Analogue Computer for Cable Temperatures (Neher), October 1951, vol. 70, No. 10, Electrical Engineering.